US011449435B2

(12) United States Patent
Liang et al.

(10) Patent No.: US 11,449,435 B2
(45) Date of Patent: *Sep. 20, 2022

(54) METHOD FOR PERFORMING ACCESS MANAGEMENT IN A MEMORY DEVICE, ASSOCIATED MEMORY DEVICE AND CONTROLLER THEREOF, AND ASSOCIATED ELECTRONIC DEVICE

(71) Applicant: Silicon Motion, Inc., Hsinchu County (TW)

(72) Inventors: Chia-Chi Liang, Hsinchu County (TW); Jie-Hao Lee, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,525

(22) Filed: Feb. 24, 2021

(65) Prior Publication Data

US 2021/0182209 A1 Jun. 17, 2021

Related U.S. Application Data

(63) Continuation of application No. 15/859,712, filed on Jan. 1, 2018, now Pat. No. 10,970,226.

(Continued)

(51) Int. Cl.
*G06F 12/1009* (2016.01)
*G06F 3/06* (2006.01)
(Continued)

(52) U.S. Cl.
CPC ........ *G06F 12/1009* (2013.01); *G06F 3/0614* (2013.01); *G06F 3/0622* (2013.01);
(Continued)

(58) Field of Classification Search
CPC ............. G06F 12/1009; G06F 12/0246; G06F 12/1433; G06F 3/0614; G06F 3/0622;
(Continued)

(56) References Cited

U.S. PATENT DOCUMENTS

| 6,105,103 A | * | 8/2000 | Courtright, II | ....... | G06F 3/0608 |
| | | | | | 711/6 |
| 8,533,389 B1 | * | 9/2013 | Goyins | ............... | G06F 12/0875 |
| | | | | | 711/108 |

(Continued)

FOREIGN PATENT DOCUMENTS

| CN | 101739352 A | 6/2010 |
| CN | 102043728 A | 5/2011 |

(Continued)

OTHER PUBLICATIONS

Wei Mao et al., A Review of Storage Technology Research Based on Phase Change Memory, May 2015, p. 944-960, vol. 38 No. 5, Chinese Journal of Computers, Beijing, PROC, May 14, 2014.

(Continued)

*Primary Examiner* — Nicholas J Simonetti
(74) *Attorney, Agent, or Firm* — Winston Hsu

(57) ABSTRACT

A method for performing access management in a memory device, the associated memory device and the controller thereof, and the associated electronic device are provided. The method may include: receiving a host command and a logical address from a host device; performing a checking operation to obtain a checking result, for determining whether to load a logical-to-physical (L2P) table from the NV memory to a random access memory (RAM) of the memory device; reading the target data and associated metadata from the NV memory, wherein a latest version of the L2P table is available in the RAM when reading the target data from the NV memory is performed; and checking whether a recorded logical address within the metadata and (Continued)

the logical address received from the host device are equivalent to each other, to control whether to send the target data to the host device.

19 Claims, 6 Drawing Sheets

Related U.S. Application Data

(60) Provisional application No. 62/568,797, filed on Oct. 6, 2017.

(51) Int. Cl.
 *G06F 12/02* (2006.01)
 *G06F 12/14* (2006.01)

(52) U.S. Cl.
 CPC .......... *G06F 3/0631* (2013.01); *G06F 3/0659* (2013.01); *G06F 3/0679* (2013.01); *G06F 12/0246* (2013.01); *G06F 12/1433* (2013.01); *G06F 2212/1008* (2013.01); *G06F 2212/1052* (2013.01); *G06F 2212/205* (2013.01); *G06F 2212/657* (2013.01); *G06F 2212/7201* (2013.01)

(58) Field of Classification Search
 CPC .... G06F 3/0631; G06F 3/0659; G06F 3/0679; G06F 2212/1008; G06F 2212/1052; G06F 2212/205; G06F 2212/657; G06F 2212/7201
 See application file for complete search history.

(56) References Cited

U.S. PATENT DOCUMENTS

| | | | | |
|---|---|---|---|---|
| 8,838,937 | B1* | 9/2014 | Katz | G06F 12/0246 711/216 |
| 8,874,850 | B1* | 10/2014 | Goodson | G06F 12/0893 711/133 |
| 8,880,812 | B1* | 11/2014 | Walch | G06F 3/0659 711/149 |
| 9,032,137 | B2 | 5/2015 | Damle | |
| 9,213,632 | B1* | 12/2015 | Song | G06F 3/0619 |
| 9,645,925 | B2 | 5/2017 | Lee | |
| 10,509,602 | B2* | 12/2019 | Song | G06F 3/0688 |
| 2007/0124531 | A1 | 5/2007 | Nishihara | |
| 2007/0208885 | A1* | 9/2007 | Otsuka | G06F 12/0804 711/E12.04 |
| 2008/0114939 | A1* | 5/2008 | Mouton | G06F 12/0895 711/128 |
| 2010/0005151 | A1* | 1/2010 | Gokhale | G06F 16/2228 709/216 |
| 2010/0131805 | A1 | 5/2010 | Katsuragi | |
| 2011/0055475 | A1* | 3/2011 | Takahashi | G06F 12/10 711/E12.001 |
| 2011/0145448 | A1* | 6/2011 | Gordon | G06F 3/0607 711/E12.001 |
| 2013/0238876 | A1* | 9/2013 | Fiske | G06F 3/067 711/216 |
| 2013/0262748 | A1 | 10/2013 | Chang | |
| 2013/0346675 | A1 | 12/2013 | Yeh | |
| 2014/0129761 | A1 | 5/2014 | Kwon | |
| 2015/0039814 | A1 | 2/2015 | Lim | |
| 2016/0147785 | A1* | 5/2016 | Thirumal | G06F 3/067 707/692 |
| 2016/0162416 | A1* | 6/2016 | Boyd | G06F 12/0246 711/202 |
| 2017/0109089 | A1* | 4/2017 | Huang | G06F 3/0625 |
| 2017/0228271 | A1* | 8/2017 | Tsirkin | G06F 11/0712 |
| 2017/0235488 | A1 | 8/2017 | Call | |
| 2017/0300246 | A1* | 10/2017 | Michaeli | G06F 3/0688 |
| 2017/0300422 | A1 | 10/2017 | Szubbocsev | |
| 2018/0275873 | A1* | 9/2018 | Frid | G06F 3/064 |
| 2018/0294952 | A1* | 10/2018 | Yuan | H04L 9/0894 |

FOREIGN PATENT DOCUMENTS

| | | |
|---|---|---|
| CN | 103455432 A | 12/2013 |
| CN | 103914391 A | 7/2014 |
| CN | 103942114 A | 7/2014 |
| CN | 104102585 A | 10/2014 |
| CN | 105740157 A | 7/2016 |
| CN | 105989871 A | 10/2016 |
| CN | 106681653 A | 5/2017 |
| TW | I447583 B | 8/2014 |
| TW | I492050 B | 7/2015 |
| TW | I498902 B | 9/2015 |
| TW | I581181 B | 5/2017 |
| TW | 201729068 A | 8/2017 |
| TW | 201735050 A | 10/2017 |

OTHER PUBLICATIONS

Keith Au, et al., MiniRISC CW4001—A Small, Low-Power MIPS CPU Core, IEEE 1995 Custom Integrated Circuits Conference, p. 577-580, 1995.

Yuanchao Xu, et al., A Survey on Security and Privacy of Emerging Non-Volatile Memory, 2016, p. 1930-1942, vol. 53 No. 9, Journal of Computer Research and Development, Beijing, PRC, Sep. 2016.

Qiuju Wang, Research and Implementation of Semantics about Relational Database Based on Ontology, Apr. 2014, A Thesis Submitted to Chongqing University in Partial Fulfillment of the Requirement for the Master's Degree of Engineering, College of Computer Science of Chongqing University, Chongqing, PRC.

\* cited by examiner

METHOD FOR PERFORMING ACCESS MANAGEMENT IN A MEMORY DEVICE, ASSOCIATED MEMORY DEVICE AND CONTROLLER THEREOF, AND ASSOCIATED ELECTRONIC DEVICE

CROSS REFERENCE TO RELATED APPLICATIONS

This application is a continuation application and claims the benefit of U.S. Non-provisional application Ser. No. 15/859,712, which was filed on Jan. 1, 2018, and is included herein by reference. In addition, the U.S. Non-provisional application Ser. No. 15/859,712 claims the benefit of U.S. Provisional Application No. 62/568,797, which was filed on Oct. 6, 2017.

BACKGROUND OF THE INVENTION

1. Field of the Invention

The present invention is related to memory control, and more particularly, to a method and apparatus for performing access management in a memory device.

2. Description of the Prior Art

Developments in memory technology have led to the wide application of portable or non-portable memory devices, such as memory cards which conform to the SD/MMC, CF, MS and XD specifications, respectively, or embedded memory devices which conform to the UFS and EMMC specifications, respectively. Improving access control of memories in these memory devices remains an issue to be solved in the art.

NAND flash memories may comprise single level cell (SLC) and multiple level cell (MLC) flash memories. In an SLC flash memory, each transistor used as a memory cell may have any of two electrical charge values, respectively representing the logic values 0 and 1. The storage ability of each transistor used as a memory cell in an MLC flash memory may be fully utilized, where the transistor may be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

Compared with the SLC flash memory, the lower cost and larger capacity of the MLC flash memory means it is more likely to be applied in memory devices. The MLC flash memory does have instability issues, however. To ensure that access control of the flash memory in the memory device meets related specifications, a controller of the flash memory is usually configured to have management mechanisms to properly manage the access of data.

Related art memory devices with the above management mechanisms still have some disadvantages. For example, one of the memory devices may comprise a random access memory (RAM) for purposes of buffering, management, etc., and the storage capacity of the RAM is typically insufficient due to budget control. The related art tries to correct the problem, but further problems (e.g. side effects) may be introduced. Hence, there is a need for a novel memory access design having robust data access mechanism, to guarantee that a memory device can operate properly in various situations, respectively.

SUMMARY OF THE INVENTION

It is an objective of the present invention to provide a method for performing access management in a memory device, the associated memory device and the controller thereof, and the associated electronic device, in order to solve the above-mentioned problems.

It is another objective of the present invention to provide a method for performing access management in a memory device, the associated memory device and the controller thereof, and the associated electronic device, in order to guarantee that the memory device can operate properly in various situations, respectively.

It is yet another objective of the present invention to provide a method for performing access management in a memory device, the associated memory device and the controller thereof, and the associated electronic device, in order to solve the related art problems without introducing any side effect or in a way that is less likely to introduce a side effect.

At least one embodiment of the present invention provides a method for performing access management in a memory device. The memory device may comprise a non-volatile (NV) memory, and the NV memory may comprise at least one NV memory element (e.g. one or more NV memory elements). The method may comprise: receiving a host command and a logical address from a host device, wherein the host command is a read command, and a combination of the host command and the logical address is directed to a request of accessing target data corresponding to the logical address from the NV memory; with regard to the request of accessing the target data corresponding to the logical address from the NV memory, performing a checking operation to obtain a checking result, for determining whether to load a logical-to-physical (L2P) table from the NV memory to a random access memory (RAM) of the memory device, wherein the L2P table comprises address mapping information for accessing the target data; reading the target data and associated metadata from the NV memory, wherein a latest version of the L2P table is available in the RAM when reading the target data from the NV memory is performed; and checking whether a recorded logical address within the metadata and the logical address received from the host device are equivalent to each other, to control whether to send the target data to the host device.

In addition to the above method, the present invention also provides a memory device, and the memory device comprises a NV memory and a controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. For example, the controller receives a host command and a logical address from the host device, wherein the host command is a read command, and a combination of the host command and the logical address is directed to a request of accessing target data corresponding to the logical address from the NV memory; with regard to the request of accessing the target data corresponding to the logical address from the NV memory, the controller performs a checking operation to obtain a checking result, for determining whether to load a logical-to-physical (L2P) table from the NV memory to a random access memory (RAM) of the memory device, wherein the L2P table comprises address mapping information for accessing the target data; the controller reads the target data and associated metadata from the NV memory, wherein a latest version of the L2P table is available in the RAM when reading the target data from the NV memory is performed; and the controller checks whether a recorded logical address within the metadata and the logical address received from the host device are equivalent to each other, to control whether to send the target data to the host device.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and a NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. For example, the controller receives a host command and a logical address from the host device, wherein the host command is a read command, and a combination of the host command and the logical address is directed to a request of accessing target data corresponding to the logical address from the NV memory; with regard to the request of accessing the target data corresponding to the logical address from the NV memory, the controller performs a checking operation to obtain a checking result, for determining whether to load a logical-to-physical (L2P) table from the NV memory to a random access memory (RAM) of the memory device, wherein the L2P table comprises address mapping information for accessing the target data; the controller reads the target data and associated metadata from the NV memory, wherein a latest version of the L2P table is available in the RAM when reading the target data from the NV memory is performed; and the controller checks whether a recorded logical address within the metadata and the logical address received from the host device are equivalent to each other, to control whether to send the target data to the host device.

The present invention method and apparatus can guarantee that the memory device can operate properly in various situations, respectively. In addition, the present invention method and apparatus provide a robust data access mechanism. As a result, various goals such as optimal performance, high security, budget control, etc. can be achieved. Additionally, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

I. The Memory System

Figure 1:
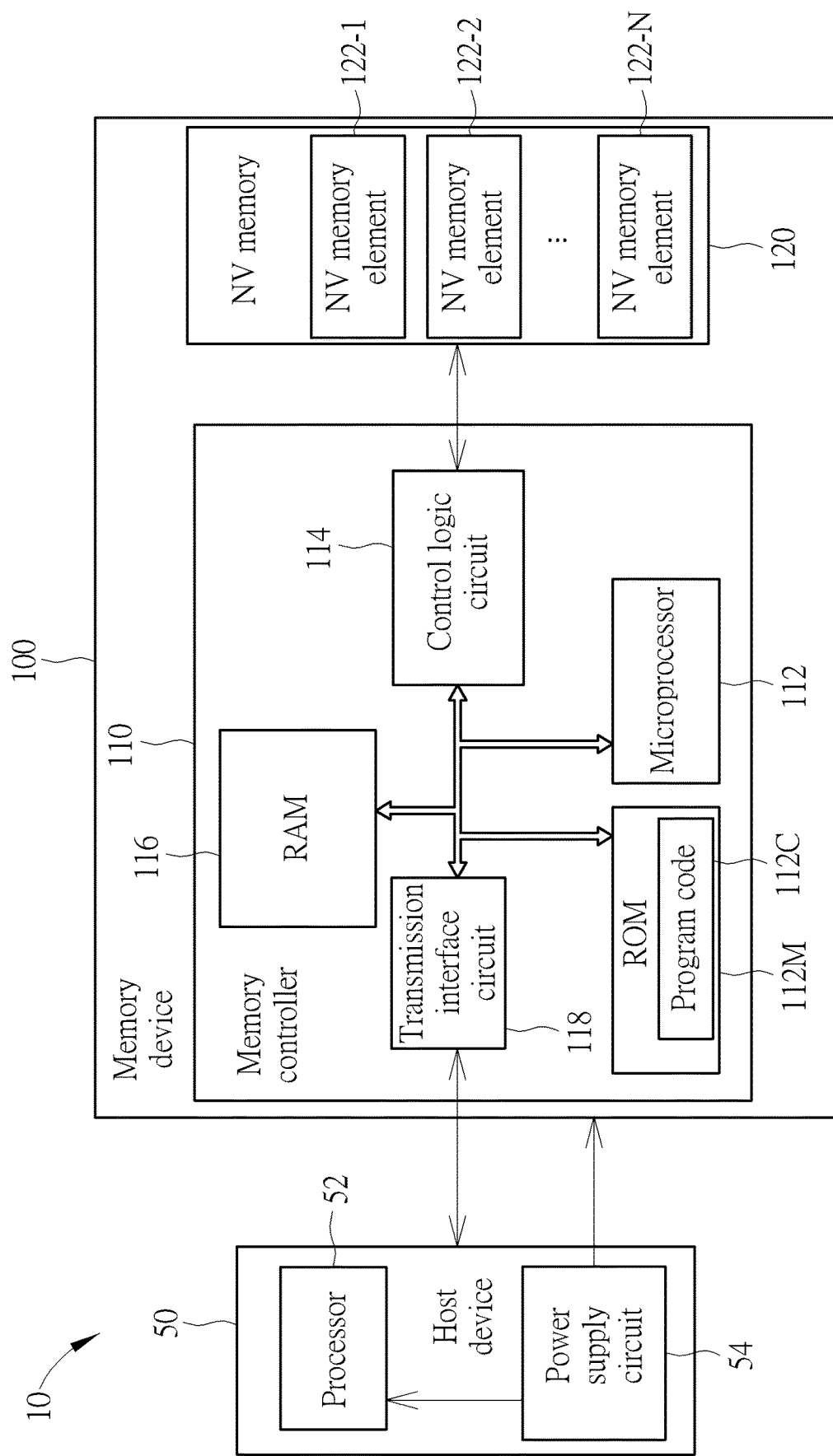
FIG. 1 is a diagram of a memory device and a host device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, and may further comprise a power supply circuit 54 that is coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a tablet, a wearable device, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded memory devices conforming to the UFS and EMMC specifications, respectively. According to this embodiment, the memory device 100 may comprise a controller such as a memory controller 110, and may further comprise a non-volatile (NV) memory 120, where the controller is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, where the above components may be coupled to one another via a bus. The RAM 116 is implemented by a Static RAM (SRAM), but the present invention is not limited thereto. The RAM 116 may be arranged to provide the memory controller 110 with internal storage space. For example, the RAM 116 may be utilized as a buffer memory for buffering data. In addition, the read-only memory 112M of this embodiment is arranged to store a program code 112C, and the microprocessor 112 is arranged to execute the program code 112C to control the access of the flash memory 120. Note that, in some examples, the program code 112C may be stored in the RAM 116 or any type of memory. Further, a data protection circuit (not shown) in the control logic circuit 114 may protect data and/or perform error correction, and the transmission interface circuit 118 may conform to a specific communications specification (e.g. the Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and may perform communications according to the specific communications specification.

In this embodiment, the host device 50 may transmit host commands and corresponding logical addresses to the memory controller 110 to access the memory device 100. The memory controller 110 receives the host commands and the logical addresses, and translates the host commands into memory operation commands (which may be simply referred to as operation commands), and further controls the NV memory 120 with the operation commands to perform reading, writing/programming or erasing upon the memory units (e.g. data pages) having physical addresses within the flash memory 120, where the physical addresses correspond to the logical addresses. When the memory controller 110 perform an erase operation on any NV memory element 122-n of the plurality of NV memory elements 122-1, 122-2, . . . , and 122-N (in which "n" may represent any integer in the interval [1, N]), at least one block of multiple blocks of the NV memory element 122-n may be erased, where each block of the blocks may comprise multiple pages (e.g. data pages), and an access operation (e.g. reading or writing) may be performed on one or more pages.

II. Data Access Mechanism

According to some embodiments, the processing circuit such as the microprocessor 112 may be arranged to control the memory controller 110 according to a plurality of host commands from the host device 50, to allow the host device 50 to access the NV memory 120 through the memory controller 110. The memory controller 110 may store data into the NV memory 120 for the host device 50, read the stored data in response to a host command (e.g. one of the plurality of host commands) from the host device 50, and provide the host device 50 with the data read from the NV memory 120. In order to enhance the performance of the memory device 100, the host device 50 may be designed to obtain some internal information of the memory device 100. The host device 50 may send back the internal information previously obtained from the memory device 100 toward the memory device 100, to allow the memory device 100 to use the internal information just sent from the host device 50, for accessing the stored data in the NV memory 120. As a result, the memory device 100 may utilize and share a RAM of the host device 50, since the internal information sent from the host device 50 may have been temporarily stored in the RAM of the host device 50. The memory controller 110 (e.g. the microprocessor 112 running the program code 112C) may control the operations of the memory device 100 according to the present invention method, to guarantee that the memory device 100 can operate properly in various situations, respectively. For example, the internal information sent from the host device 50 may be incorrect, and the memory controller 110 can detect this situation and prevent malfunction, etc. of the memory device 100. In another example, the information may be altered, and the memory controller 110 can detect this situation and prevent some security issues.

Figure 2:
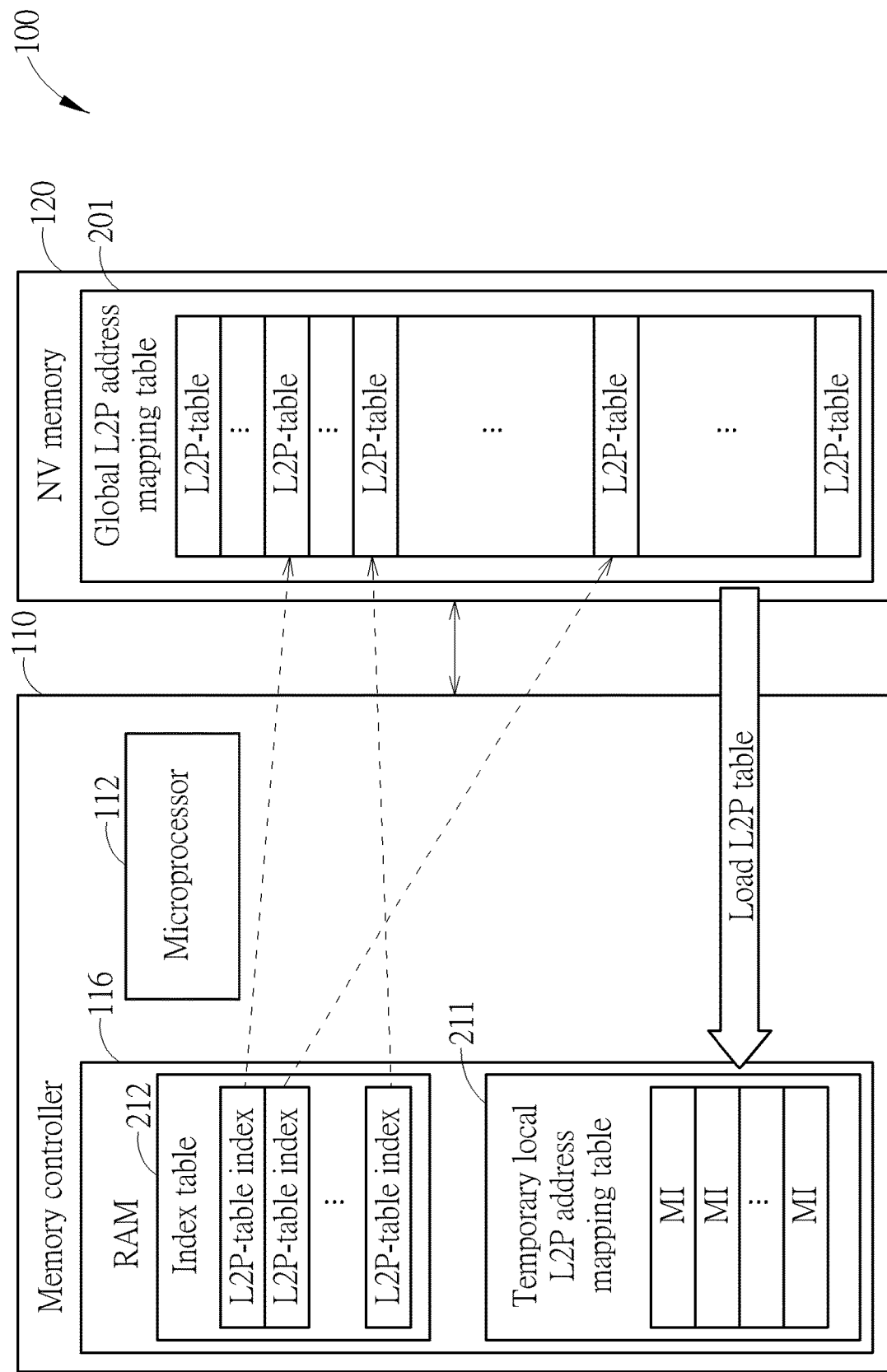
FIG. 2 illustrates an address mapping control scheme of a method for performing access management in a memory device such as that shown in FIG. 1 according to an embodiment of the present invention.

FIG. 2 illustrates an address mapping control scheme of a method for performing access management in a memory device such as that shown in FIG. 1 according to an embodiment of the present invention. Each of the NV memory elements 122-1, 122-2, . . . , and 122-N in the NV memory 120 may comprise a plurality of physical blocks, and each of the physical blocks may comprise a plurality of physical pages. Under control of the processing circuit such as the microprocessor 112, the memory controller 110 may store a global logical-to-physical (L2P) address mapping table 201 in the NV memory 120, and maintain (e.g. change and/or update) the global L2P address mapping table 201 according to the usage of the NV memory 120. The global L2P address mapping table 201 may comprise a plurality of local L2P address mapping tables (labeled "L2P table" in FIG. 2, for brevity), where a local L2P address mapping table may comprise multiple sets of L2P address mapping information for mapping logical addresses (e.g. addresses associated to host commands, for accessing data stored in the NV memory 120) to physical addresses (e.g. addresses pointing toward locations of stored data within the NV memory 120), respectively, and any set within the sets of L2P address mapping information may be mapping information (MI) for mapping a logical address of a host command to a physical address of the NV memory 120.

In addition, the memory controller 110 may store (e.g. load) at least one local L2P address mapping table (e.g. one or more local L2P address mapping tables) of the plurality of local L2P address mapping tables into the RAM 116 as the temporary local L2P address mapping table 211, and maintain (e.g. change and/or update) the temporary local L2P address mapping table 211 according to the usage of the NV memory 120. When needed, the memory controller 110 may update the global L2P address mapping table 201 according to the temporary local L2P address mapping table 211. For better comprehension, multiple boxes labeled "MI" may be illustrated in the temporary local L2P address mapping table 211 to represent multiple sets of L2P address mapping information therein, but the present invention is not limited thereto. For example, one set of these sets of L2P address mapping information may be the mapping information for mapping a first logical address to a first physical address. In another example, another set of these sets of L2P address mapping information may be the mapping information for mapping a second logical address to a second physical address. According to some embodiments, implementation of the sets of L2P address mapping information in the local L2P address mapping table may vary. For example, any set of the sets of L2P address mapping information in the local L2P address mapping table may comprise a physical address, and the ranking of the physical address among others of the physical addresses in the local L2P address mapping table may represent a logical address, but the present invention is not limited thereto. In another example, any set of the sets of L2P address mapping information in the local L2P address mapping table may comprise a logical address and a physical address.

Additionally, the memory controller 110 may store an index table 212 in the RAM 116, and maintain (e.g. change and/or update) the index table 212 according to the usage of the NV memory 120. The index table 212 may comprise a plurality of L2P-table indexes, and an L2P-table index of the plurality of L2P-table indexes may be an index for indexing an L2P table such as one of the plurality of local L2P address mapping tables. For example, the L2P-table index may be a physical address that points toward the location where the L2P table is stored (e.g. a physical page in a physical block), and the memory controller 110 may find the L2P table according to the L2P-table index.

According to some embodiments, the memory controller 110 may simply read the temporary local L2P address mapping table 211 when needed, rather than changing and/or updating the temporary local L2P address mapping table 211 according to the usage of the NV memory 120, since the memory controller 110 may directly update the global L2P address mapping table 201 according to the usage of the NV memory 120. According to some embodiments, the NV memory 120 may be a triple level cell (TLC) NAND flash memory, and the plurality of NV memory elements 122-1, 122-2, . . . , and 122-N may be TLC NAND flash elements, where the memory controller 110 may configure some blocks of the NV memory 120 to be single level cell (SLC) blocks, and may configure some other blocks of the NV memory 120 to be TLC blocks. The memory controller 110 may utilize a portion of blocks of the NV memory 120 as buffer blocks for buffering data, while utilizing another portion of blocks of the NV memory 120 as data blocks for storing data. When the host device 50 writes data to the NV memory 120 through the memory controller 110, the memory controller 110 may select a buffer block as a current block for receiving the data. When the current block is full (e.g. all pages therein for storing data have been programmed with data), the memory controller 110 may close this block, for example, may write close information such as end-of-block (EOB) information into the last page of this block, to make it become a data block. As the writing speeds of the SLC blocks are typically higher than that of the TLC blocks, the block that the memory controller 110 selects as the current block for receiving the data may be an SLC block. For example, when the number of used SLC blocks (e.g. SLC blocks that have been used since the latest erasure thereof) is greater than a predetermined value, the memory controller 110 may trigger a garbage collection (GC) procedure to collect valid data from the used SLC blocks into one or more TLC blocks, but the present invention is not limited thereto. For another example, when the number of spare SLC blocks (e.g. SLC blocks that have not been used since the latest erasure thereof) is less than a predetermined value, the memory controller 110 may trigger the GC procedure to collect the valid data from the used SLC blocks into the one or more TLC blocks. Please note that, when writing data into the buffer block that is selected as the current block, the memory controller 110 may establish, in the RAM 116, a physical-to-logical (P2L) address mapping table (not shown) corresponding to the buffer block, and may maintain (e.g. change and/or update) the P2L address mapping table in the RAM 116 according to the usage of the NV memory 120. When the current block (i.e. this buffer block) is full, the memory controller 110 may close this block and update the global L2P address mapping table 201 according to the P2L address mapping table.

According to some embodiments, the memory controller 110 may send a set of internal mapping information of the memory device 100 toward the host device 50, to allow the host device 50 to own the set of internal mapping information, for enhancing performance of the memory device 100. For example, the set of internal mapping information may comprise a copy of a set of local L2P address mapping tables within the plurality of local L2P address mapping tables, and may further comprise the L2P-table indexes of the set of local L2P address mapping tables, such as the L2P-table indexes pointing toward the locations where the set of local L2P address mapping tables are stored, respectively.

When the host device 50 sends a host command to access target data at a logical block address, the host device 50 may send the corresponding internal mapping information within the set of internal mapping information. The corresponding internal mapping information may comprise a local L2P address mapping table having the set of L2P address mapping information (e.g. the MI) of the logical block address, for a purpose of finding the physical block and the physical page storing the target data. The corresponding internal mapping information may further comprise the L2P-table index of this local L2P address mapping table, such as the L2P-table indexes pointing toward the location where this local L2P address mapping table is stored, for a purpose of checking the correctness of the corresponding internal mapping information (e.g. checking whether it is true that the corresponding internal mapping information is not out of date and that the corresponding internal mapping information is not altered for bad intention).

The memory controller 110 may check whether the L2P-table index within the corresponding internal mapping information is the same as that stored in the index table 212, to determine whether the corresponding internal mapping information is correct. When the L2P-table index within the corresponding internal mapping information is the same as that stored in the index table 212, the memory controller 110 determines that the corresponding internal mapping information is correct (which may indicate that the corresponding internal mapping information is not out of date and that the corresponding internal mapping information is not altered), and therefore the memory controller 110 may utilize this local L2P address mapping table as the reference for finding the target data; otherwise, the memory controller 110 determines that the corresponding internal mapping information is incorrect (which may indicate that the corresponding internal mapping information is out of date or that the corresponding internal mapping information is altered), and therefore the memory controller 110 may not utilize this local L2P address mapping table as the reference for finding the target data. For the case that the corresponding internal mapping information is incorrect, the memory controller 110 may utilize its own version of internal mapping information, such as the correct L2P-table index in the index table 212 and the local L2P address mapping table that is found through the correct L2P-table index in the index table 212.

Figure 3:
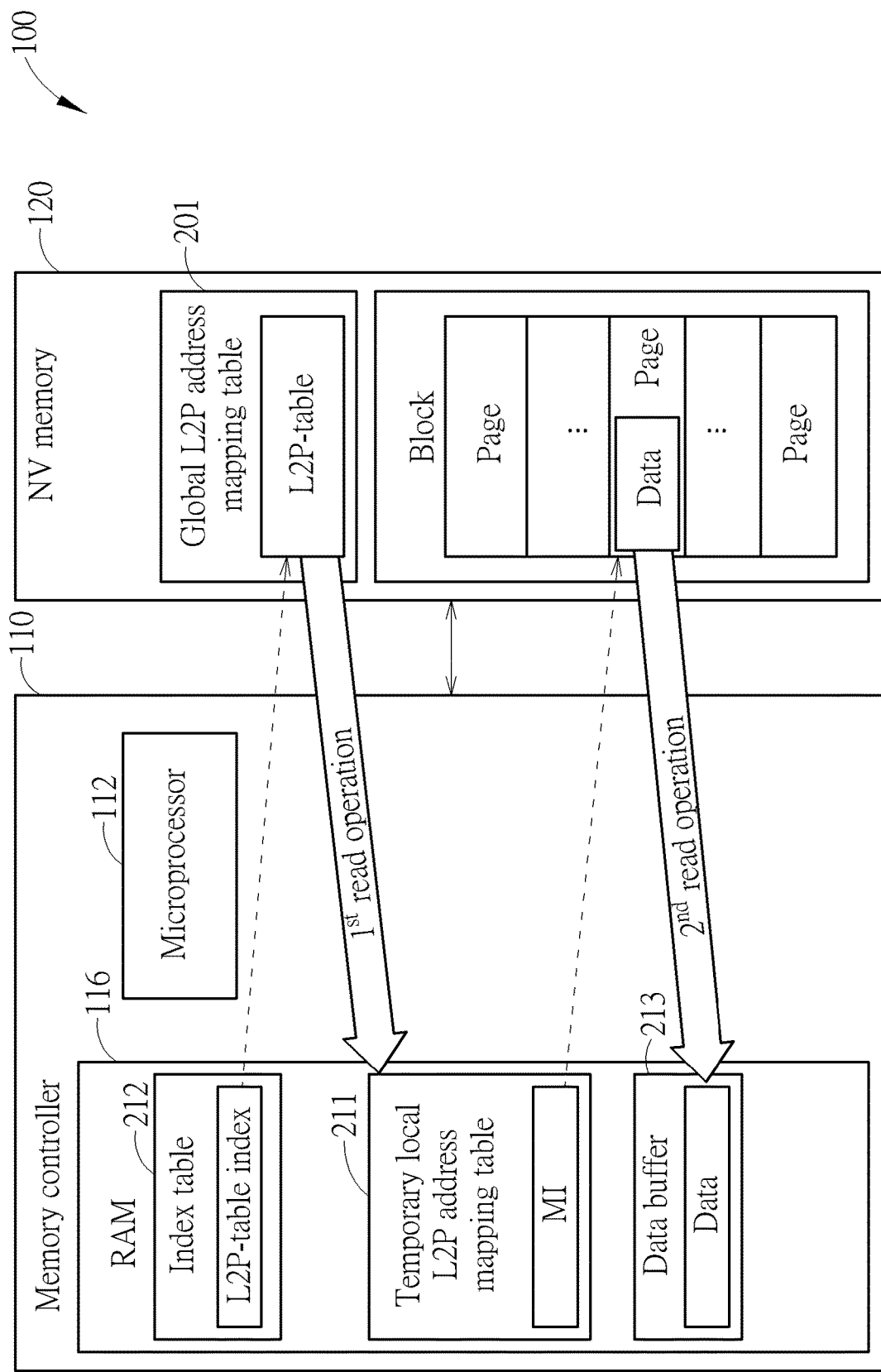
FIG. 3 illustrates a dual-read control scheme of the method for performing access management in the memory device according to an embodiment of the present invention.

FIG. 3 illustrates a dual-read control scheme of the aforementioned method for performing access management in the memory device such as that shown in FIG. 1 according to an embodiment of the present invention. The memory controller 110 may control the memory device 100 according to the dual-read control scheme in a situation where the corresponding internal mapping information is incorrect, but the present invention is not limited thereto. For example, the memory controller 110 may control the memory device 100 according to the dual-read control scheme in a situation where the memory controller 110 has not sent the set of internal mapping information of the memory device 100 toward the host device 50. For another example, the memory controller 110 may control the memory device 100 according to the dual-read control scheme when needed, no matter whether the memory controller 110 has sent the set of internal mapping information of the memory device 100 toward the host device 50.

For better comprehension, suppose that the corresponding internal mapping information is incorrect, and therefore the memory controller 110 may utilize its own version of internal mapping information, such as the correct L2P-table index in the index table 212 and the local L2P address mapping table (labeled "L2P table" in FIG. 3) that is found through the correct L2P-table index in the index table 212. For example, the memory controller 110 may read the local L2P address mapping table that is found through the correct L2P-table index in the index table 212, and this reading operation may be regarded as the first read operation (labeled "1$^{st}$ read operation" in FIG. 3) for accessing the target data. As a result of the first read operation, the temporary local L2P address mapping table 211 may comprise the set of L2P address mapping information (e.g. the MI) for finding the target data, such as the set of L2P address mapping information (e.g. the MI) that maps the logical address of the target data (e.g. the logical block address, etc. of the target data as indicated in the host command that asks for the target data) to the physical address (e.g. at least one physical address, such as the physical block address together with the page address indicating the physical page where the target data is stored). As shown in FIG. 3, the set of L2P address mapping information such as the MI pointing to one of the physical pages (labeled "Page") of the physical block (labeled "Block") indicates that the memory controller 110 can find the target data (labeled "Data") according to the set of L2P address mapping information (e.g. the MI). The memory controller 110 may read the target data from this physical page, and this reading operation may be regarded as the second read operation (labeled "2$^{nd}$ read operation" in FIG. 3) for accessing the target data. As a result of the second read operation, the data buffer 213 may comprise the target data (labeled "Data"), for being accessed by the host device 50. For example, the host device 50 may read the target data in the data buffer 213 through direct memory access (DMA).

According to some embodiments, the operation of loading the aforementioned at least one local L2P address mapping table (e.g. the one or more local L2P address mapping tables) of the plurality of local L2P address mapping tables into the RAM 116 as the temporary local L2P address mapping table 211 may comprise reading the local L2P address mapping table that is found through the correct L2P-table index in the index table 212.

Figure 4:
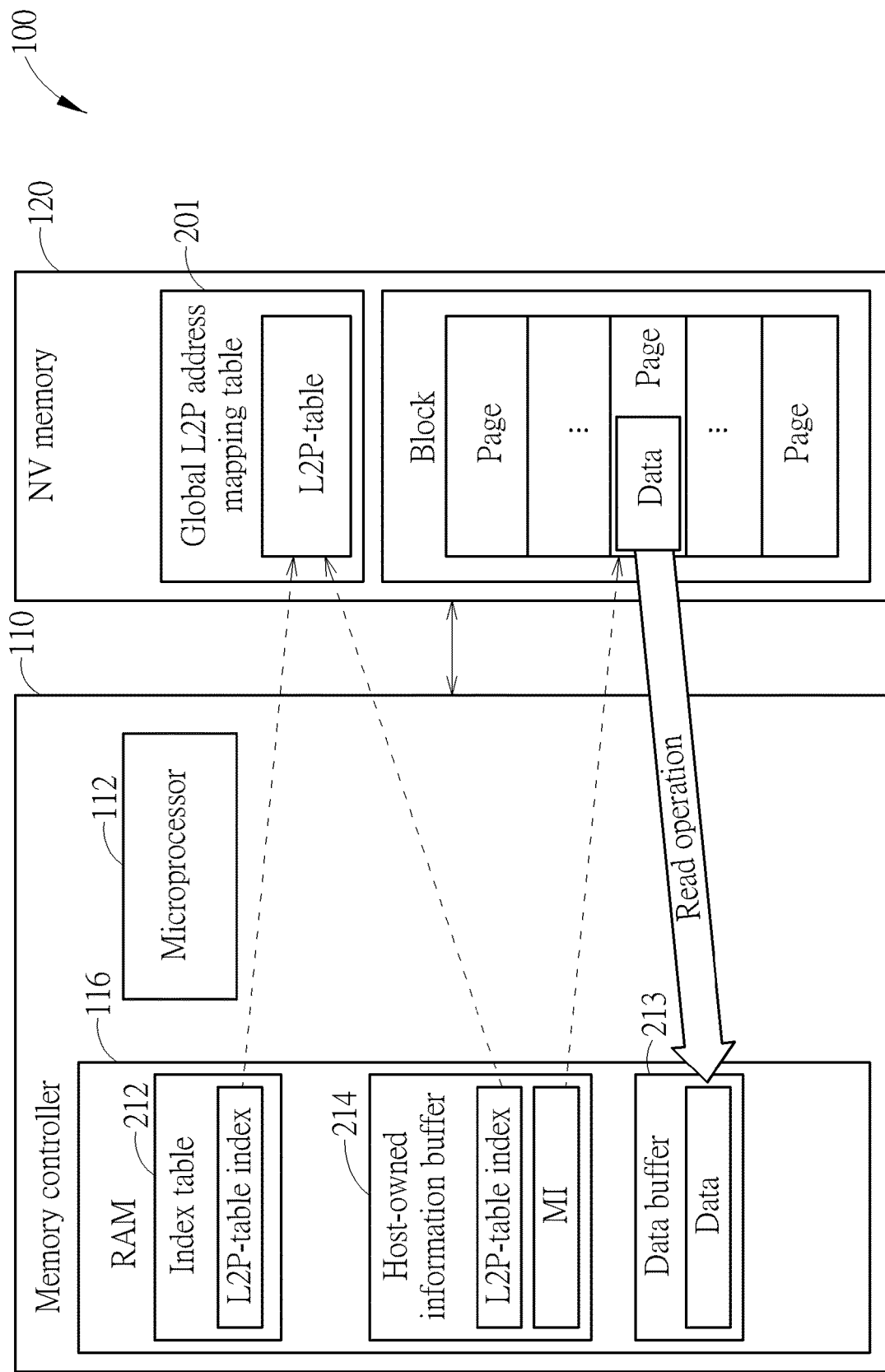
FIG. 4 illustrates a host-owned information (HOI) checking control scheme of the method for performing access management in the memory device according to an embodiment of the present invention.

FIG. 4 illustrates a host-owned information (HOI) checking control scheme of the method for performing access management in the memory device according to an embodiment of the present invention. As the memory controller 110 has sent the set of internal mapping information of the memory device 100 toward the host device 50, the set of internal mapping information in the host device 50 may be regarded as host-owned information (HOI). When sending a host command such as that mentioned above to access the target data, the host device 50 may send the set of L2P address mapping information (e.g. the MI) together with the L2P-table index, such as the combination of the set of L2P address mapping information (e.g. the MI) and the L2P-table index that is within the HOI. As a result, the memory device 100 may receive the set of L2P address mapping information (e.g. the MI) together with the L2P-table index, such as the combination of the set of L2P address mapping information (e.g. the MI) and the L2P-table index within the HOI, and may store them in the host-owned information (HOI) buffer 214.

The memory controller 110 may check whether the L2P-table index in the host-owned information buffer 214 is the same as the correct L2P-table index mentioned above (such as the L2P-table index in the index table 212 shown in FIG. 4), to determine whether to utilize the set of L2P address mapping information (e.g. the MI) in the host-owned information buffer 214 as the reference for accessing the target data. When the L2P-table index in the host-owned information buffer 214 is the same as the correct L2P-table index, the memory controller 110 may utilize the set of L2P address mapping information (e.g. the MI) in the host-owned information buffer 214 as the reference for accessing the target data; otherwise (which means the set of L2P address mapping information (e.g. the MI) in the host-owned information buffer 214 may be out of date or may be not reliable), the memory controller 110 may prevent utilizing the set of L2P address mapping information (e.g. the MI) in the host-owned information buffer 214 as the reference for accessing the target data, and may control the memory device 100 according to the dual-read control scheme shown in FIG. 3.

As shown in FIG. 4, both of the correct L2P-table index in the index table 212 and the L2P-table index in the host-owned information buffer 214 are pointing toward the same L2P address mapping table, since the L2P-table index in the host-owned information buffer 214 is the same as the correct L2P-table index. In this situation, the set of L2P address mapping information (e.g. the MI) in the host-owned information buffer 214 may be reliable and is not out of date. The memory controller 110 can find the target data (labeled "Data") according to the set of L2P address mapping information (e.g. the MI) in the host-owned information buffer 214. The memory controller 110 may read the target data from the physical page indicated by the set of L2P address mapping information (e.g. the MI) in the host-owned information buffer 214, and this reading operation may be regarded as the single read operation (labeled "Read operation" in FIG. 4) for accessing the target data. As a result of the single read operation, the data buffer 213 may comprise the target data (labeled "Data"), for being accessed by the host device 50. For example, the host device 50 may read the target data in the data buffer 213 through DMA.

Based on the HOI checking control scheme shown in FIG. 4, when the L2P-table index in the host-owned information buffer 214 is the same as the correct L2P-table index, the memory controller 110 may rapidly obtain the target data through the single read operation, which is much faster than multiple read operations (e.g. the first and the second read operations). As a result, the performance of the memory device 100 is enhanced, and the overall performance of the electronic device is enhanced.

In addition, the operation of checking whether the L2P-table index in the host-owned information buffer 214 is the same as the correct L2P-table index may prevent the memory device 100 from obtaining wrong data (e.g. old data or invalid data) from the NV memory 120 for the host device 50. Therefore, the HOI checking control scheme shown in FIG. 4 may guarantee that the corresponding internal mapping information is not out of date and that the corresponding internal mapping information is not altered for bad intention. Additionally, the probability of the occurrence of memory system error due to wrong data may be greatly reduced.

Figure 5:
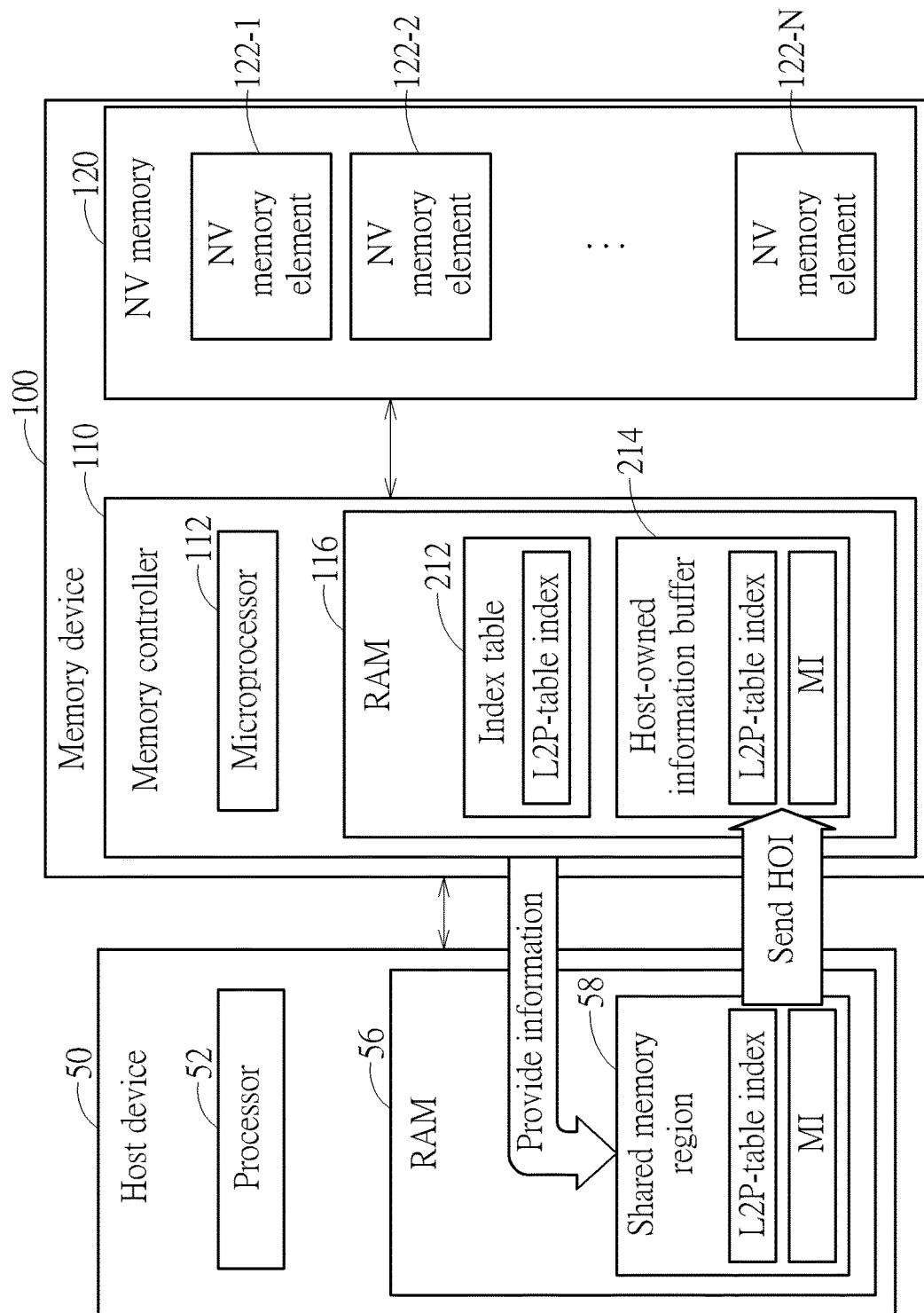
FIG. 5 illustrates a random access memory (RAM)-sharing control scheme of the method for performing access management in the memory device according to an embodiment of the present invention.

FIG. 5 illustrates a random access memory (RAM)-sharing control scheme of the method for performing access management in the memory device according to an embodiment of the present invention. According to this embodiment, the host device 50 may comprise at least one processor (e.g. one or more processors) such as the processor 52, and may comprise a RAM 56, where the RAM 56 may comprise a shared memory region 58. The memory controller 110 may provide information such as the set of internal mapping information to the host device 50, and the host device 50 may send at least one portion (e.g. a portion or all) of the HOI toward the memory device 100 when asking for the target data (e.g. by sending the host command such as a read command). For example, the aforementioned at least one portion of the HOI may comprise the set of L2P address mapping information (e.g. the MI) together with the L2P-table index, such as the combination of the set of L2P address mapping information (e.g. the MI) and the L2P-table index that is within the HOI. When the combination of the set of L2P address mapping information (e.g. the MI) and the L2P-table index that is within the HOI is correct and is not out of date, the memory controller 110 may control the memory device 100 according to the HOI checking control scheme shown in FIG. 4 (rather than the dual-read control scheme shown in FIG. 3), to obtain the target data through the single read operation (labeled "Read operation" in FIG. 4).

Based on various control schemes of the present invention method, such as the dual-read control scheme shown in FIG. 3, the HOI checking control scheme shown in FIG. 4, and the RAM-sharing control scheme shown in FIG. 5, when the storage capacity of the RAM 116 is insufficient (e.g. due to a limited budget design, a cost-down design, etc.), the present invention method and the associated architecture can solve the related art problems without introducing any side effect or in a way that is less likely to introduce a side effect.

Figure 6:
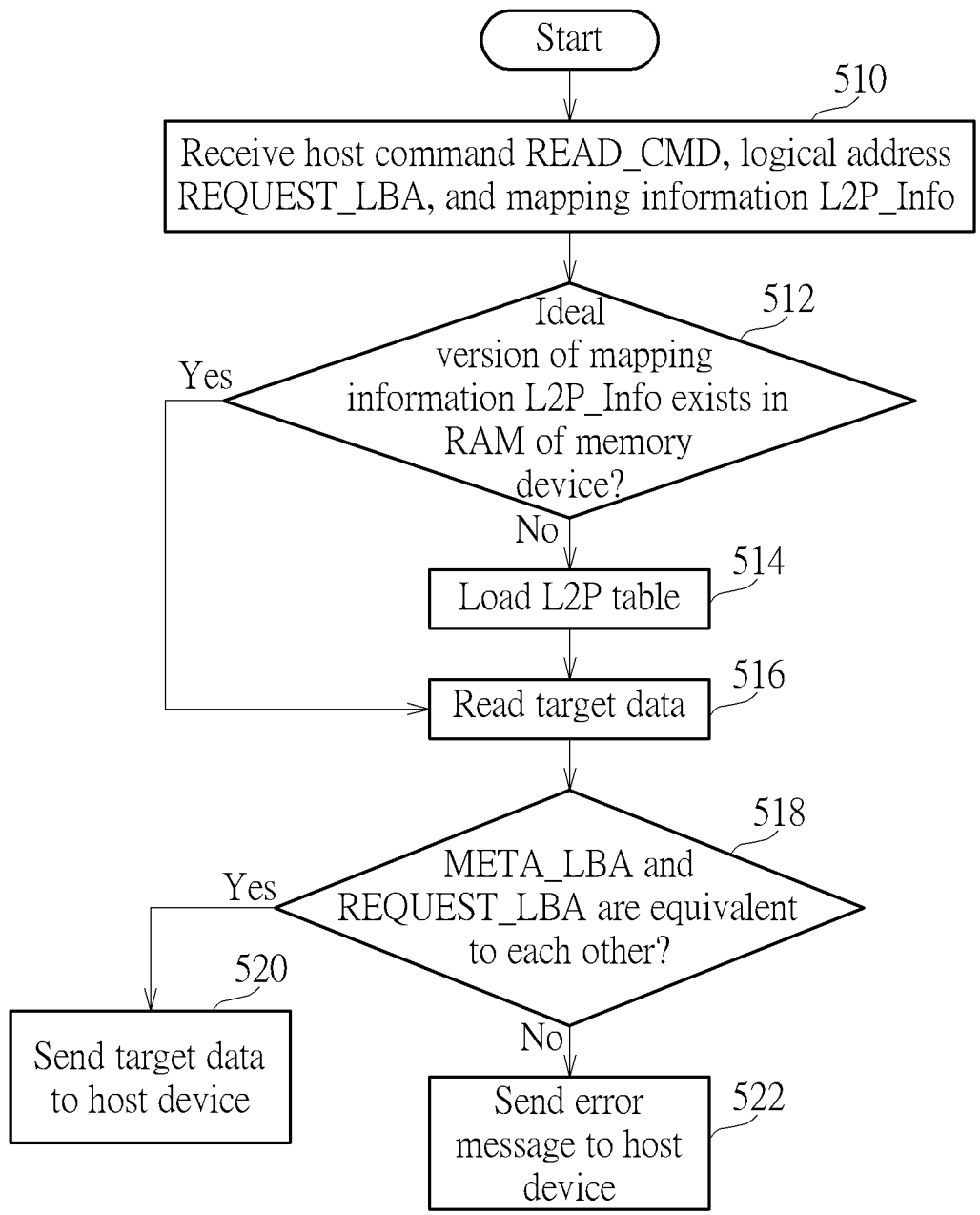
FIG. 6 illustrates a working flow of the method for performing access management in the memory device according to an embodiment of the present invention.

FIG. 6 illustrates a working flow of the method for performing access management in the memory device according to an embodiment of the present invention.

In Step 510, the memory device 100 may receive the host command READ_CMD, the associated logical address REQUEST_LBA, and the mapping information L2P_Info from the host device 50. According to this embodiment, the read command may be taken as an example of the host command READ CMD, the logical address of the target data may be taken as an example of the logical address REQUEST_LBA, and the set of L2P address mapping information (e.g. the MI) of the target data may be taken as an example of the mapping information L2P_Info, but the present invention is not limited thereto. For example, when the host device 50 is operating abnormally, the mapping information L2P_Info may have been altered or may have become non-related to the target data. In another example, when the host device 50 is operating abnormally, at least one (e.g. one or more) of the associated logical address REQUEST_LBA and the mapping information L2P_Info may have been altered or may have become non-related to the target data.

In Step 512, the memory controller 110 may check whether the ideal version of the mapping information L2P_Info (e.g. the MI shown in FIG. 3) exists in the RAM 116 of the memory device 100. This may be implemented according to one or more of the control schemes mentioned above (e.g. the dual-read control scheme shown in FIG. 3, the HOI checking control scheme shown in FIG. 4, and/or the RAM-sharing control scheme shown in FIG. 5), but the present invention is not limited thereto. According to this embodiment, the memory controller 110 may utilize its own version of internal mapping information, such as the set of L2P address mapping information (e.g. the MI) pointing toward the target data and available in the temporary local L2P address mapping table 211, as the ideal version of the mapping information L2P_Info, where the set of L2P address mapping information (e.g. the MI) can be obtained from the local L2P address mapping table that is found through the correct L2P-table index in the index table 212. When the ideal version of the mapping information L2P_Info exists in the RAM 116 of the memory device 100, Step 516 is entered; otherwise, Step 514 is entered.

In Step 514, the memory controller 110 may load the L2P table such as that read in the first read operation mentioned above.

In Step 516, the memory controller 110 may read the target data (e.g. the data read in the second read operation, or the data read in the single read operation) from the physical page. For example, the memory controller 110 may also read metadata from the physical page, where the metadata may comprise the logical address META_LBA of the target data, such as the logical address that the memory controller 110 recorded in the physical page when the data was written in the physical page. Thus, the metadata may be associated to the target data.

In Step 518, the memory controller 110 may check whether the logical address META_LBA within the metadata of the physical page and the logical address REQUEST_ LBA are equivalent to each other. When the logical address META_LBA within the metadata of the physical page and the logical address REQUEST_LBA are equivalent to each other (which may indicate that the host device 50 is operating normally), Step 520 is entered; otherwise (which may indicate that the host device 50 is operating abnormally), Step 522 is entered.

In Step 520, the memory controller 110 may send the target data to the host device 50. For example, in a situation where the host device 50 is operating normally and has not been hacked or maliciously tampered, the memory controller 110 may send out requested data (e.g. the target data) to the host device 50 as usual.

In Step 522, the memory controller 110 may send an error message to the host device 50. For example, in a situation where the host device 50 has been hacked or maliciously tampered (e.g. the processor 52 is running one or more malware programs, such as a first malware program that tries to steal something from the memory device 100, a second malware program that tries to perform reverse engineering or the like on the memory device 100, etc.), the memory controller 110 can prevent the host device 50 from accessing the target data.

According to this embodiment, the combination of the host command READ_CMD and the logical address REQUEST_LBA mentioned in Step 510 may be directed to a request of accessing the target data corresponding to the logical address REQUEST_LBA from the NV memory 120. With regard to the request of accessing the target data corresponding to the logical address REQUEST_LBA from the NV memory 120, the memory controller 110 may perform the checking operation of Step 512 to obtain the checking result (which may indicate whether the ideal version of mapping information L2P_Info exists in the RAM 116 or not), for determining whether to load the L2P table mentioned in Step 514 from the NV memory 120 to the RAM 116, where the L2P table may comprise the address mapping information for accessing the target data, such as the set of L2P address mapping information (e.g. the MI). In addition, the memory controller 110 may read the target data and the associated metadata from the NV memory 120 in Step 516, where the latest version (e.g. a loaded version or an updated version) of the L2P table is available in the RAM 116 when reading the target data from the NV memory 120 is performed. For example, Step 514 may be entered, and the L2P table may be loaded into the RAM 116 as the loaded version of the L2P table. In another example, before the checking operation of Step 512 is performed, the L2P table may have been loaded into the RAM 116 as the loaded version of the L2P table. In some examples, the memory controller 110 may update the L2P table (e.g. the loaded version of the L2P table) to generate the updated version of the L2P table. Additionally, in Step 516, the memory controller 110 may check whether the recorded logical address META_LBA within the metadata and the logical address REQUEST_LBA received from the host device 50 are equivalent to each other, to control whether to send the target data to the host device 50, for example, to perform the operation of Step 520 or the operation of Step 522.

Regarding the HOI mentioned above, the memory controller 110 may send the set of internal mapping information of the memory device 100 toward the host device 50 as the HOI, for enhancing performance of the memory device 100, where the set of internal mapping information is related to mapping logical addresses to multiple physical addresses of the NV memory120. This is typically performed in advance. After sending the set of internal mapping information of the memory device 100 toward the host device 50 as the HOI, the memory controller 110 may receive the host command READ CMD, the logical address REQUEST_LBA, and the mapping information L2P_Info from the host device 50, where the mapping information L2P_Info is related to mapping the logical address REQUEST_LBA to a physical address of the NV memory 120. In addition, the mapping information L2P_Info may be received as at least one portion (e.g. a portion or all) of the HOI, and more particularly, may be received as the portion of the HOI regardless of the correctness of the mapping information L2P_Info, since the memory controller 110 can check the correctness of the mapping information L2P_Info through the operation of Step 518. The host device 50 may send the mapping information L2P_Info toward the memory device 100 for guiding the memory device 100 to access the target data according to the mapping information L2P_Info, but the memory device 100 (e.g. the memory controller 110) may reject the request when needed (e.g. in a situation where Step 522 is entered). For example, when the physical address is directed to the target data (which means the mapping information L2P_Info is correct), the recorded logical address META_LBA within the metadata and the logical address REQUEST_LBA received from the host device 50 are equivalent to each other, so Step 520 is entered. In another example, when the physical address is not directed to the target data (which means the mapping information L2P_Info is incorrect), the recorded logical address META_LBA within the metadata and the logical address REQUEST_LBA received from the host device 50 are not equivalent to each other, so Step 520 is entered.

Recording the metadata is typically performed in advance, for example, before the working flow shown in FIG. 6. Before receiving the host command READ CMD, the logical address REQUEST_LBA, etc. from the host device 50, the memory controller 110 may write the target data in the physical page corresponding to the logical address REQUEST_LBA and may record the recorded logical address META_LBA of the target data in the physical page. As a result, in Step 516, the memory controller 110 may read the target data and the associated metadata from the physical page, and may obtain the recorded logical address META_LBA of the target data from the associated metadata. With aid of the metadata recorded in advance, the memory controller 110 that controls the operations of the memory device 100 according to the present invention method can guarantee that the memory device 100 can operate properly in various situations, respectively, where various goals such as optimal performance, high security, budget control, etc. can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management in a memory device, the memory device comprising a non-volatile (NV) memory, the NV memory comprising at least one NV memory element, the method comprising:
   receiving a host command, as well as mapping information, index information and a logical address carried by the host command, from a host device, wherein the host command is a read command, the mapping information is related to mapping the logical address to a physical address of the NV memory, and a combination of the host command and the logical address is directed to a request of accessing target data corresponding to the logical address from the NV memory;
   performing a checking operation regarding correctness of the mapping information to obtain a checking result by comparing the index information with index information stored in a random access memory (RAM) of the memory device, wherein when the checking result is positive, confirming the mapping information stored in the RAM is a correct version, and when the checking result is negative, loading a logical-to-physical (L2P) table from the NV memory to the RAM of the memory device to update the mapping information stored in the RAM, wherein the L2P table comprises address mapping information for accessing the target data;
   accessing the mapping information in the RAM to read the target data and associated metadata from the NV memory; and
   checking whether a recorded logical address within the metadata and the logical address received from the host device are equivalent to each other, to control whether to send the target data to the host device.

2. The method of claim 1, further comprising:
   when the recorded logical address within the metadata and the logical address received from the host device are equivalent to each other, sending the target data to the host device.

3. The method of claim 1, further comprising:
   when the recorded logical address within the metadata and the logical address received from the host device are not equivalent to each other, preventing the host device from accessing the target data.

4. The method of claim 1, further comprising:
   when the recorded logical address within the metadata and the logical address received from the host device are equivalent to each other, sending the target data to the host device, otherwise, preventing the host device from accessing the target data.

5. The method of claim 1, further comprising:
before receiving the host command, as well as the mapping information, the index information and the logical address carried by the host command, from the host device, sending a set of internal mapping information of the memory device toward the host device as host-owned information (HOI), for enhancing performance of the memory device, wherein the set of internal mapping information is related to mapping logical addresses to physical addresses of the NV memory; and
sending at least one portion of the HOI as the mapping information.

6. The method of claim 5, wherein the host device sends the mapping information toward the memory device for guiding the memory device to access the target data according to the mapping information.

7. The method of claim 5, wherein when the physical address is directed to the target data, the recorded logical address within the metadata and the logical address received from the host device are equivalent to each other.

8. The method of claim 7, wherein when the physical address is not directed to the target data, the recorded logical address within the metadata and the logical address received from the host device are not equivalent to each other.

9. The method of claim 5, wherein when the physical address is not directed to the target data, the recorded logical address within the metadata and the logical address received from the host device are not equivalent to each other.

10. The method of claim 1, further comprising:
before receiving the host command and the logical address from the host device, writing the target data in a physical page corresponding to the logical address and recording the recorded logical address of the target data in the physical page;
wherein the step of reading the target data and the associated metadata from the NV memory further comprises:
reading the target data and the associated metadata from the physical page, and obtaining the recorded logical address of the target data from the associated metadata.

11. A memory device, comprising:
a non-volatile (NV) memory, arranged to store information, wherein the NV memory comprises at least one NV memory element; and
a controller, coupled to the NV memory, arranged to control operations of the memory device, wherein the controller comprises:
a processing circuit, arranged to control the controller according to a plurality of host commands from a host device, to allow the host device to access the NV memory through the controller, wherein:
the controller receives a host command, as well as mapping information, index information and a logical address carried by the host command, from the host device, wherein the host command is a read command, the mapping information is related to mapping the logical address to a physical address of the NV memory, and a combination of the host command and the logical address is directed to a request of accessing target data corresponding to the logical address from the NV memory;
the controller performs a checking operation regarding correctness of the mapping information to obtain a checking result by comparing the index information with index information stored in a random access memory (RAM) of the memory device, wherein when the checking result is positive, confirming the mapping information stored in the RAM is a correct version, and when the checking result is negative, loading a logical-to-physical (L2P) table from the NV memory to the RAM of the memory device to update the mapping information stored in the RAM, wherein the L2P table comprises address mapping information for accessing the target data;
the controller accesses the mapping information in the RAM to read the target data and associated metadata from the NV memory; and
the controller checks whether a recorded logical address within the metadata and the logical address received from the host device are equivalent to each other, to control whether to send the target data to the host device.

12. The memory device of claim 11, wherein when the recorded logical address within the metadata and the logical address received from the host device are equivalent to each other, the controller sends the target data to the host device.

13. The memory device of claim 11, wherein when the recorded logical address within the metadata and the logical address received from the host device are not equivalent to each other, the controller prevents the host device from accessing the target data.

14. The memory device of claim 11, wherein before receiving the host command, as well as the mapping information, the index information and the logical address carried by the host command, from the host device, the controller sends a set of internal mapping information of the memory device toward the host device as host-owned information (HOI), for enhancing performance of the memory device, wherein the set of internal mapping information is related to mapping logical addresses to physical addresses of the NV memory; and the controller sends at least one portion of the HOI as the mapping information.

15. An electronic device comprising the memory device of claim 11, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

16. A controller of a memory device, the memory device comprising the controller and a non-volatile (NV) memory, the NV memory comprising at least one NV memory element, the controller comprising:
a processing circuit, arranged to control the controller according to a plurality of host commands from a host device, to allow the host device to access the NV memory through the controller, wherein:
the controller receives a host command, as well as mapping information, index information and a logical address carried by the host command, from the host device, wherein the host command is a read command, the mapping information is related to mapping the logical address to a physical address of the NV memory, and a combination of the host command and the logical address is directed to a request of accessing target data corresponding to the logical address from the NV memory;

the controller performs a checking operation regarding correctness of the mapping information to obtain a checking result by comparing the index information with index information stored in a random access memory (RAM) of the memory device, wherein when the checking result is positive, confirming the mapping information stored in the RAM is a correct version, and when the checking result is negative, loading a logical-to-physical (L2P) table from the NV memory to the RAM of the memory device to update the mapping information stored in the RAM, wherein the L2P table comprises address mapping information for accessing the target data;

the controller accesses the mapping information in the RAM to read the target data and associated metadata from the NV memory; and the controller checks whether a recorded logical address within the metadata and the logical address received from the host device are equivalent to each other, to control whether to send the target data to the host device.

17. The controller of claim 16, wherein when the recorded logical address within the metadata and the logical address received from the host device are equivalent to each other, the controller sends the target data to the host device.

18. The controller of claim 16, wherein when the recorded logical address within the metadata and the logical address received from the host device are not equivalent to each other, the controller prevents the host device from accessing the target data.

19. The controller of claim 16, wherein before receiving the host command, as well as the mapping information, the index information and the logical address carried by the host command, from the host device, the controller sends a set of internal mapping information of the memory device toward the host device as host-owned information (HOI), for enhancing performance of the memory device, wherein the set of internal mapping information is related to mapping logical addresses to physical addresses of the NV memory; and the controller sends at least one portion of the HOI as the mapping information.

* * * * *